(12) United States Patent
Lin

(10) Patent No.: US 9,078,326 B2
(45) Date of Patent: Jul. 7, 2015

(54) DIMMABLE LED LAMP

(71) Applicant: HEP TECH CO., LTD., Taichung (TW)

(72) Inventor: Ming-Feng Lin, Taichung (TW)

(73) Assignees: HEP TECH CO., LTD., Taichung (TW); Ming-Feng Lin, Taichung (TW)

( * ) Notice: Subject to any disclaimer, the term of this patent is extended or adjusted under 35 U.S.C. 154(b) by 0 days.

(21) Appl. No.: 14/165,151

(22) Filed: Jan. 27, 2014

(65) Prior Publication Data

US 2014/0217922 A1 Aug. 7, 2014

(30) Foreign Application Priority Data

Feb. 5, 2013 (TW) ................................. 102202488

(51) Int. Cl.
*H05B 37/02* (2006.01)
*H05B 33/08* (2006.01)

(52) U.S. Cl.
CPC ........ *H05B 33/0845* (2013.01); *H05B 33/0815* (2013.01); *Y02B 20/346* (2013.01)

(58) Field of Classification Search
CPC ........... H05B 33/0815; H05B 33/0857; H05B 33/0845; F21Y 2101/02; F21Y 2103/022; F21V 29/004; F21V 7/008
USPC ........ 315/56, 58, 61, 247, 291, 312; 362/217.02, 217.1, 217.13, 249.02, 362/249.06, 800, 640, 647
See application file for complete search history.

(56) References Cited

U.S. PATENT DOCUMENTS

| | | | |
|---|---|---|---|
| 7,300,173 B2 * | 11/2007 | Catalano et al. | 362/208 |
| 8,390,207 B2 * | 3/2013 | Dowling et al. | 315/186 |
| 8,593,044 B2 * | 11/2013 | Grajcar | 313/113 |
| 8,808,025 B2 * | 8/2014 | Sekine et al. | 439/389 |
| 2011/0222849 A1 * | 9/2011 | Han et al. | 398/25 |
| 2012/0099317 A1 * | 4/2012 | Liu | 362/249.02 |
| 2014/0035486 A1 * | 2/2014 | Ando et al. | 315/307 |

* cited by examiner

*Primary Examiner* — Haiss Philogene
(74) *Attorney, Agent, or Firm* — WPAT, PC; Justin King

(57) ABSTRACT

A dimmable LED lamp, which receives power from a DC power source to emit light, includes a main body, a DC/DC converter, and a LED module; wherein the main body is hollow, and includes a conductive portion made of a conductive material, wherein the conductive portion is connected to the DC power source; the DC/DC converter is provided in the main body, and is electrically connected to the conductive portion of the main body to receive a power from at least a DC power source; the DC/DC converter converts a voltage of the power provided by the DC power source into a corresponding current; the LED module is provided on the main body, and is electrically connected to the DC/DC converter to emit light with luminance corresponding to the current received from the DC/DC converter.

9 Claims, 2 Drawing Sheets

DIMMABLE LED LAMP

The current application claims a foreign priority to the patent application of Taiwan No. 102202488 filed on Feb. 5, 2013.

BACKGROUND OF THE INVENTION

1. Technical Field

The present invention relates generally to a LED lamp, and more particularly to a dimmable LED lamp, luminance of which could be changed with different voltages provided to the LED lamp.

2. Description of Related Art

Fluorescent lamps are the commonest device for indoor lighting. In order to provide a room with different luminance, a conventional method is to light different numbers of fluorescent lamps since each fluorescent lamp can be turned on and off only, and there is no intermediate status in between. Sometimes, such method leads to uneven brightness in the room when fluorescent lamps at specific locations are off. Furthermore, only a few grades of luminance can be selected because the on/off combinations of fluorescent lamps in a room are limited. In addition, a fluorescent lamp is driven by alternate current (AC) to emit light, and therefore it inevitably flashes, which could cause eyestrain or even eyesight damage.

Therefore, light emitting diode (LED) gradually replaces fluorescent lamps in illumination systems because of its environmental friendliness and its better performance in electro-optical conversion. And since LED is driven by direct current (DC), it doesn't flash, which is another advantage over fluorescent lamps. However, the conventional LED lamps emphasis on keeping stable luminance as voltage fluctuates, which means adjusting the luminance of LED lamps in a DC system is still a problem unresolved.

BRIEF SUMMARY OF THE INVENTION

In view of the above, the primary objective of the present invention is to provide a dimmable LED lamp applied in a DC system, and luminance of which could be changed with different voltages provided to the LED lamp.

The present invention provides a dimmable LED lamp for receiving power from a DC power source to emit light, which includes a main body, a DC/DC converter, and a LED module. The main body is hollow, and has a conductive portion made of a conductive material, wherein the conductive portion is connected to the DC power source; the DC/DC converter is provided in the main body, and is electrically connected to the conductive portion of the main body to convert a voltage of the power from the DC power source into a corresponding current; the LED module is provided on the main body, and is electrically connected to the DC/DC converter to emit light with luminance corresponding to the current received from the DC/DC converter.

Whereby, with the aforementioned design, the dimmable LED lamp provided in the present invention could be applied in a DC system, and its luminance could be changed with different voltages provided to the LED lamp.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
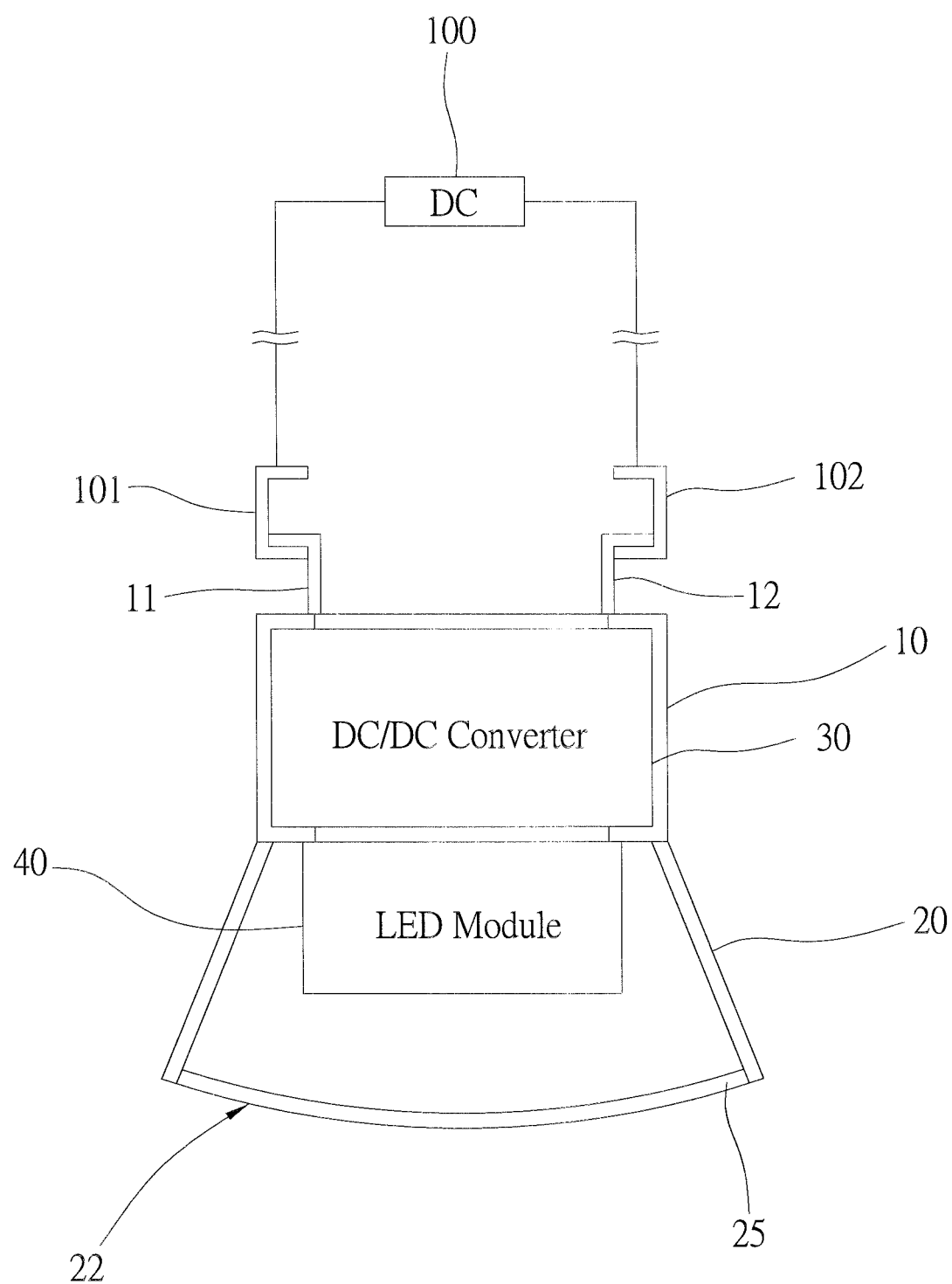
FIG. 1 is a sketch diagram of a first preferred embodiment of the present invention.

As shown in FIG. 1, a dimmable LED lamp of the first preferred embodiment of the present invention receives a power from a DC power source 100 to emit light, and the DC power source 100 has a positive terminal and a negative terminal, wherein the positive terminal and the negative terminal respectively have a track 101, 102 which are made of metal. The dimmable LED lamp includes a main body 10, a mask 20, a lens 25, a DC/DC converter 30, and a LED module 40.

The main body 10 is a hollow case, and has a conductive portion thereon. The conductive portion has a first terminal 11 and a second terminal 12 which are made of conductive materials, wherein the first terminal 11 and the second terminal 12 are isolated with each other. In the preferred embodiment, the first terminal 11 and the second terminal 12 are hooked metal plates, which are respectively engaged with the track 101 and the track 102.

The mask 20 flares out, and has an opening 22 at a wide end thereof, wherein an inner surface of the mask 20 is reflective, and the mask 20 is connected to the main body 10 with a narrow end opposite to the opening 22, which makes the mask 20 be provided on the main body 10 at a side thereof opposite to the terminals 11, 12.

In the preferred embodiment, the lens 25 is a concave lens made of plastic materials, which is provided on the mask 20, and covers the opening 22. Of course, the lens 25 could be made of glass, and could be a convex lens or a flat lens as demanded in practice.

The DC/DC converter 30 is provided in the main body 10, and is electrically connected to the terminals 11, 12 of the conductive portion, in order to receive the power provided by the DC power source through the tracks 101,102 and the terminals 11, 12. The DC/DC converter 30 converts a voltage of the power provided by the DC power source (which is a potential difference between the tracks 101, 102) into a corresponding current. In addition, in the preferred embodiment, the current provided by the DC/DC converter 30 is directly proportional to the voltage of the power provided by the DC power source 100. In other words, as the voltage of the power provided by the DC power source 100 gets higher, the current generated by the DC/DC converter 30 becomes stronger as well.

The LED module 40 has a plurality of LEDs provided on the main body 10 and inside the mask 20, wherein the LEDs are electrically connected to the DC/DC converter 30. The LED module 40 continuously receives the current from the DC/DC converter 30 to make the LEDs emit light through the lens 25, and therefore provides an illumination function. It is widely known that luminance of a LED is directly proportional to the current provided to the LED, which means that the LED module 40 generates higher luminance when provided with stronger current. On the contrary, the LED module 40 generates lower luminance when provided with weaker current.

As the aforementioned description, if the voltage of the DC power source 100 is adjusted, the current provided by the DC/DC converter 30 would be changed as well, and the purpose of adjusting the luminance of the LED module 40 could be achieved in this way.

It is noted that, since the inner surface of the mask 20 is reflective, the light goes toward the main body 10 cold be reflected to a direction of the opening 22, which enhances an illumination efficiency of the dimmable LED lamp. Besides, the lens 25 is a concave lens, which could scatter the light comes out from the opening 22, which effectively enlarges an illumination range of the dimmable LED lamp, and protects the LED module 40 provided in the mask 20.

Figure 2:
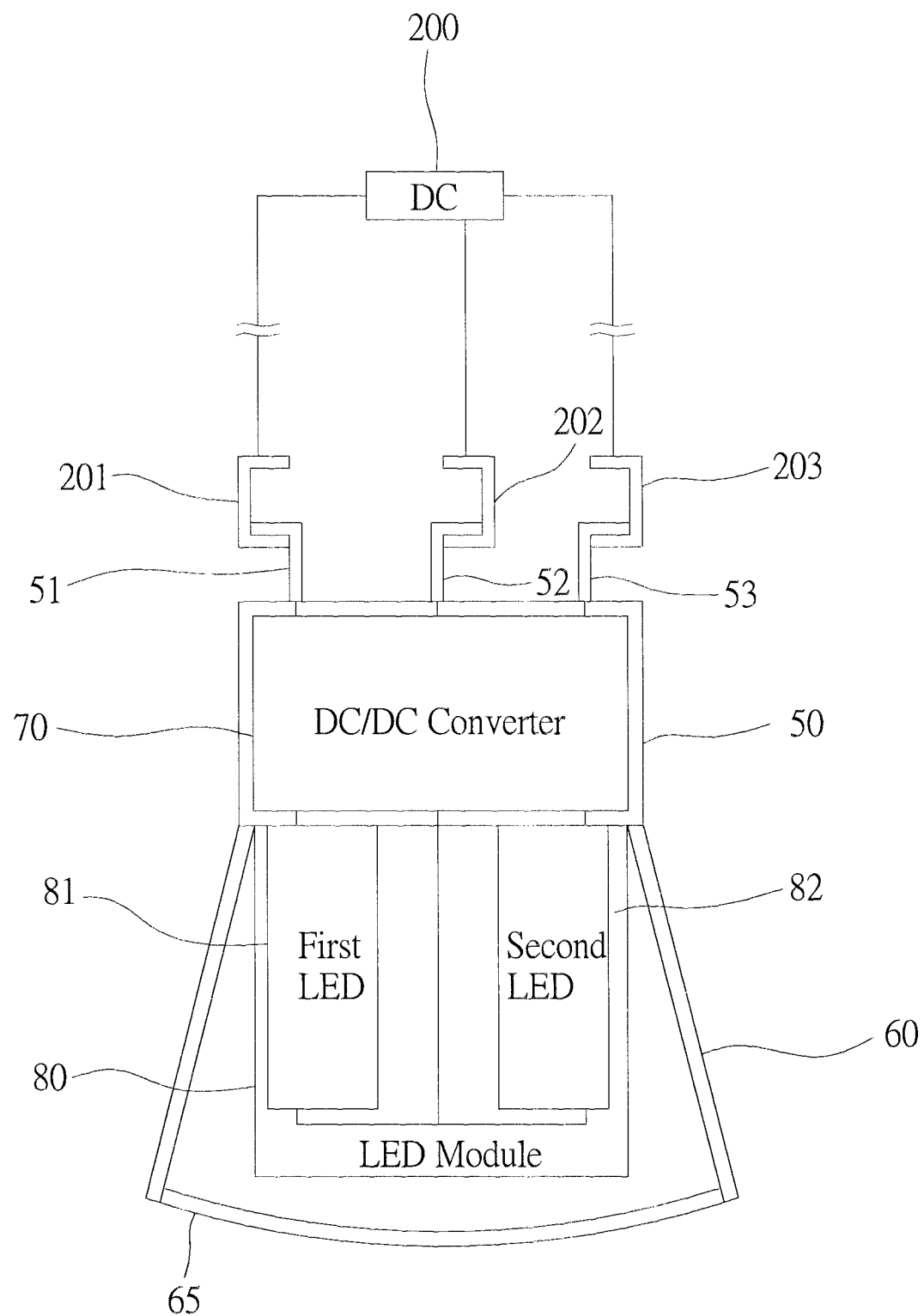
FIG. 2 is a sketch diagram of a second preferred embodiment of the present invention.

In addition to the aforementioned design, the dimmable LED lamp of the second preferred embodiment of the present invention shown in FIG. 2 further provides the function of changing light colors. The dimmable LED lamp of the second preferred embodiment includes a main body 50, a mask 60, a lens 65, a DC/DC converter 70, and a LED module 80 too, just as the first embodiment. The differences between the two embodiments are described as follows. The DC power source 200 which provides power to the dimmable LED lamp includes a first positive terminal, a second positive terminal, and a negative terminal, which respectively have a track 201~203 made of metal. In addition, a potential difference between the first positive terminal (track 201) and the negative terminal (track 202) is a first voltage, and a potential difference between the second positive terminal (track 203) and the negative terminal (track 202) is a second voltage. Therefore, in order to coordinate the differences described above, the conductive portion of the main body 50 has a first terminal 51, a second terminal 52, and a third terminal 53, which are hooked metal plates. The terminals 51~53 are isolated with each other too. The first terminal 51 is connected to the track 201, the second terminal 52 is connected to the track 202, and the third terminal 53 is connected to the track 203.

The DC/DC converter 70 is provided in the main body 50 too, and is connected to the terminals 51~53. The DC/DC converter 70 converts the first voltage into a corresponding first current, and converts the second voltage into a corresponding second current.

The LED module 80 includes a plurality of first LEDs 81 and a plurality of second LEDs 82, and a light color of the second LEDs 82 is different from that of the first LEDs 82. For example, the light color of the first LED 81 is cold (such as white or blue), and the light color of the second LED 82 is warm (such as yellow or red). The LED module 80 is provided inside the mask 60, and is electrically connected to the DC/DC converter 50, wherein the first LED 81 receives the first current, and the second LED 82 receives the second current.

With the aforementioned design, by adjusting the first voltage and the second voltage of the power provided by the DC power source 200 respectively, the first current and the second current provided by the DC/DC converter 70 could be changed, and therefore luminance of the first LEDs 81 and the second LEDs 82 could be adjusted, and the purpose of changing the light color of the LED module 80 could be achieved.

It is noted that the dimmable LED illuminating system of the present invention may be applied to a desk lamp, streetlamp, and other illuminating device. It must be pointed out that the embodiments described above are only some preferred embodiments of the present invention. All equivalent structures and methods which employ the concepts disclosed in this specification and the appended claims should fall within the scope of the present invention.

What is claimed is:

1. A dimmable LED lamp for receiving power from a DC power source to emit light, comprising:

a main body, which is hollow, having a conductive portion made of a conductive material, wherein the conductive portion is connected to the DC power source;

a DC/DC converter provided in the main body, and electrically connected to the conductive portion of the main body to convert a voltage of the power from the DC power source into a corresponding current;

a LED module provided on the main body, and electrically connected to the DC/DC converter to emit light with luminance corresponding to the current received from the DC/DC converter; and the current outputted from the DC/DC converter is varied in accordance with variance of the voltage of the power from the DC power source, which makes the LED module naturally emit light with different luminance accordingly.

2. The dimmable LED lamp of claim 1, wherein the DC power source has a positive terminal and a negative terminal; the conductive portion has a first terminal and a second terminal, which are isolated with each other; the first terminal is connected to the positive terminal, and the second terminal is connected to the negative terminal; the DC/DC converter is connected to the first terminal and the second terminal.

3. The dimmable LED lamp of claim 1, wherein the DC power source has a first positive terminal, a second positive terminal and a negative terminal; a potential difference between the first positive terminal and the negative terminal is a first voltage, and a potential difference between the second positive terminal and the negative terminal is a second voltage; the conductive portion has a first terminal, a second terminal, and a third terminal, which are isolated with each other; the first terminal is connected to the first positive terminal, the second terminal is connected to the negative terminal, and the third terminal is connected to the second positive terminal; the DC/DC converter is connected to the first terminal, the second terminal, and the third terminal; the DC/DC converter converts the first voltage into a corresponding first current, and converts the second voltage into a corresponding second current; the LED module includes a first LED, which receives the first current to emit light, and a second LED, which receives second current to emit light.

4. The dimmable LED lamp of claim 3, wherein a light color of the first LED is different from that of the second LED.

5. The dimmable LED lamp of claim 1, wherein the main body further includes a mask; at least a part of the mask is light-penetrative, and the LED module is provided in the mask.

6. The dimmable LED lamp of claim 5, wherein the main body further includes a lens provided on the mask to cover the light-penetrative part thereof; the light of the LED module emits through the lens.

7. The dimmable LED lamp of claim 2, wherein the positive terminal and the negative terminal respectively have a track made of metal; the first terminal and the second terminal of the conductive portion are both a hooked metal plate to engage each track.

8. The dimmable LED lamp of claim 3, wherein the first positive terminal, the second positive terminal, and the negative terminal respectively have a track made of metal; the first terminal, the second terminal, and the third terminal of the conductive portion are all a hooked metal plate to engage each track.

9. The dimmable LED lamp of claim 1, wherein the current provided by the DC/DC converter is directly proportional to the voltage of the power provided by the DC power source.

* * * * *